United States Patent [19]
Inaba

[11] Patent Number: 5,109,291
[45] Date of Patent: Apr. 28, 1992

[54] FERROELECTRIC LIQUID CRYSTAL OPTICAL MODULATION DEVICE HAVING NON-PIXEL PORTIONS CONTROLLED TO A PREDETERMINED ORIENTATION STATE

[75] Inventor: Yutaka Inaba, Kawaguchi, Japan

[73] Assignee: Canon Kabushiki Kaisha, Tokyo, Japan

[21] Appl. No.: 300,187

[22] Filed: Jan. 23, 1989

Related U.S. Application Data

[63] Continuation of Ser. No. 24,062, Mar. 10, 1987, abandoned.

[30] Foreign Application Priority Data

Mar. 11, 1986 [JP] Japan .................. 61-53456

[51] Int. Cl.$^5$ .................................... G02F 1/13
[52] U.S. Cl. .................................... 359/56; 359/63; 359/87; 359/76
[58] Field of Search .................. 350/350 S, 333, 337, 350/334, 336, 340, 341; 340/784, 765

[56] References Cited

U.S. PATENT DOCUMENTS

| | | | |
|---|---|---|---|
| 4,128,313 | 12/1978 | Cole, Jr. et al. | 350/340 |
| 4,277,144 | 7/1981 | Saurer et al. | 350/340 |
| 4,367,924 | 1/1983 | Clark et al. | 350/334 |
| 4,380,372 | 4/1983 | Taguchi | 350/341 |
| 4,412,214 | 10/1983 | Tanaka et al. | 340/765 |
| 4,709,994 | 12/1987 | Kanbe et al. | 350/350 S |
| 4,778,259 | 10/1988 | Kitayama et al. | 350/341 |
| 4,824,213 | 4/1989 | Morokawa | 350/333 |
| 4,846,560 | 7/1989 | Tsuboyama et al. | 350/336 |
| 4,878,740 | 11/1989 | Inaba et al. | 350/337 |
| 4,941,736 | 7/1990 | Taniguchi et al. | 350/350 S |

FOREIGN PATENT DOCUMENTS

| | | | |
|---|---|---|---|
| 0091637 | 10/1983 | European Pat. Off. | 350/350 S |
| 2159635 | 12/1985 | United Kingdom | 350/346 |

OTHER PUBLICATIONS

N. A. Clark—"Fast and Bistable Electro-Optics Displays Using FLC", Eurodisplay—1984—pp. 73–76.

Primary Examiner—Stanley D. Miller
Assistant Examiner—Tai V. Duong
Attorney, Agent, or Firm—Fitzpatrick, Cella, Harper & Scinto

[57] ABSTRACT

An optical modulation device, comprising a) a cell structure including: oppositely spaced electrodes forming a pixel portion where the opposite electrodes face each other and a non-pixel portion where the opposite electrodes do not face each other, and a ferroelectric liquid crystal showing optically bistable states and disposed between the opposite electrodes over the pixel portion and the non-pixel portion; and b) at least one polarizer. The ferroelectric liquid crystal at the non-pixel portion is placed in an orientation state providing one optically stable state, and the angle between an average molecular axis of the ferroelectric liquid crystal in the orientation state and the polarization axis of one of the above mentioned at least one polarizer is smaller than the angle between the average molecular axis and a central axis of orientation of the ferroelectric liquid crystal.

7 Claims, 5 Drawing Sheets

F I G. 6
COMPARATIVE EMBODIMENT

FIG. 7

FIG. 8
COMPARATIVE EMBODIMENT

FIG. 9

FERROELECTRIC LIQUID CRYSTAL OPTICAL MODULATION DEVICE HAVING NON-PIXEL PORTIONS CONTROLLED TO A PREDETERMINED ORIENTATION STATE

This application is a continuation of application Ser. No. 024,062 filed Mar. 10, 1987 now abandoned.

FIELD OF THE INVENTION AND RELATED ART

The present invention relates to an optical modulation device, particularly to a ferroelectric liquid crystal device which is adapted for a dot matrix-type display apparatus.

Flat panel display devices have been and are being actively developed all over the world. Among these, a display device using liquid crystal has been fully accepted in commercial use if attention is restricted to small devices. However, it has been very difficult to develop a display device which has both a high resolution and a large picture area such that it can substitute for a CRT (cathode ray tube) by means of a conventional liquid crystal system, e.g., those using a TN (twisted nematic) or DS (dynamic scattering) mode.

In order to overcome the drawbacks of such prior art liquid crystal devices, the use of a liquid crystal device having optical bistability has been proposed by Clark and Lagerwall (e.g., Japanese Laid-Open Patent Application No. 56-107216; U.S. Pat. No. 4,367,924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, different from optical modulation devices in which the above-mentioned TN-type liquid crystals are used, the bistable liquid crystal molecules are oriented to first and second optically stable states with respect to one and the other electric field vectors, respectively. The characteristics of liquid crystals of this type are such that they are oriented to either of two stable states at an extremely high speed and the states are maintained when an electric field is not supplied thereto. By utilizing such properties, the ferroelectric liquid crystal device using chiral smectic phase can essentially improve a large number of the problems involved in the prior art devices described above.

In a process for producing such a ferroelectric liquid crystal device, in order to form chiral smectic phase, a gradual cooling step is required for causing a phase transition from a higher temperature phase, e.g., isotropic phase, nematic phase or cholesteric phase into the chiral smectic phase. When the ferroelectric liquid crystal is disposed in a layer thin enough to release the helical structure of the chiral smectic phase, the helical structure is unwound or is released during the cooling step to provide at least two optically stable states with nearly equal proportions.

Incidentally, in a ferroelectric liquid crystal device composed or adapted for a display, particularly a dot matrix display, pixels are formed at portions where oppositely disposed electrodes face each other so that the optical states of the pixels are switched by applying voltage signals between the electrodes, while no optical switching is caused at non-pixel portions where the electrodes do not face each other (as no voltage signals are applied there).

When such a ferroelectric liquid crystal device for display is produced through the gradual cooling step described above, the ferroelectric liquid crystal molecules at the non-pixel portions are distributed into a first stable state and a second stable state nearly in equal proportions, and these states are not substantially changed thereafter because no electric field is applied at the non-pixel portions without oppositely facing electrodes. As a result, when a pair of cross nicol polarizers having mutually intersecting polarization axes are disposed to sandwich the liquid crystal device, a sufficient degree of transmittance or interruption of light is not obtained at the non-pixel portions where the first and second optically stable states are mixed. This causes a lowering in contrast at the time of display or occurrence of mottled display states including a bright (white) state and a dark (black) state.

SUMMARY OF THE INVENTION

A principal object of the present invention is to provide an optical modulation device, particularly a ferroelectric liquid crystal device, capable of providing good display quality and contrast.

According to the present invention, there is provided an optical modulation device, comprising:

a) a cell structure including oppositely spaced electrodes forming a pixel portion where the opposite electrodes face each other and a non-pixel portion where the opposite electrodes do not face each other, and a ferroelectric liquid crystal showing optically bistable states and disposed between the opposite electrodes over the pixel portion and the non-pixel portion; and b) at least one polarizer; wherein the ferroelectric liquid crystal at the non-pixel portion is placed in an orientation state providing one optically stable state, and the angle between an average molecular axis of the ferroelectric liquid crystal in said orientation state and the polarization axis of one of said at least one polarizer is smaller than the angle between said average molecular axis and a central axis of orientation of the ferro-electric liquid crystal.

These and other objects, features and advantages of the present invention will become more apparent upon a consideration of the following description of the preferred embodiments of the present invention taken in conjunction with the accompanying drawings.

DETAILED DESCRIPTION OF PREFERRED EMBODIMENTS

Figure 1:
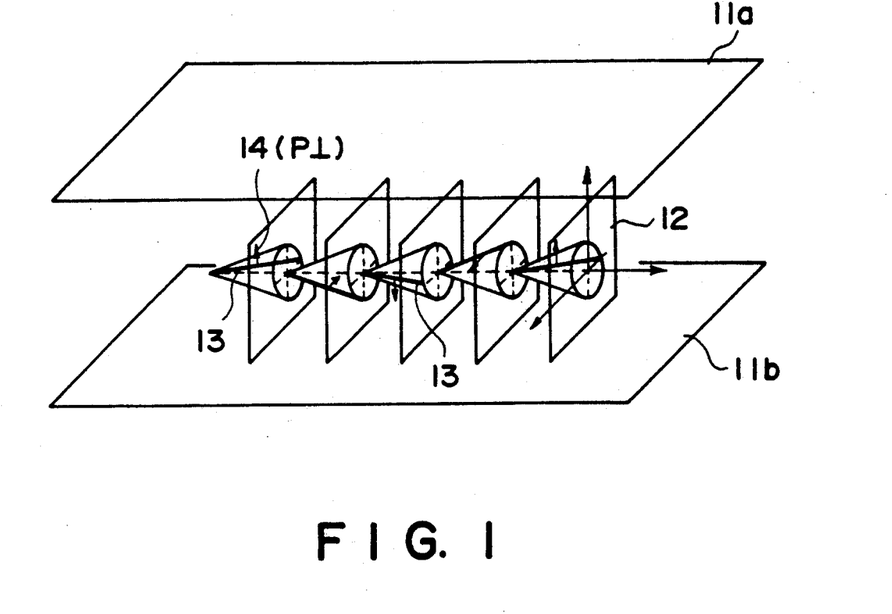
FIG. 1 is a schematic perspective view illustrating operation of a ferroelectric liquid crystal.
Figure 2:
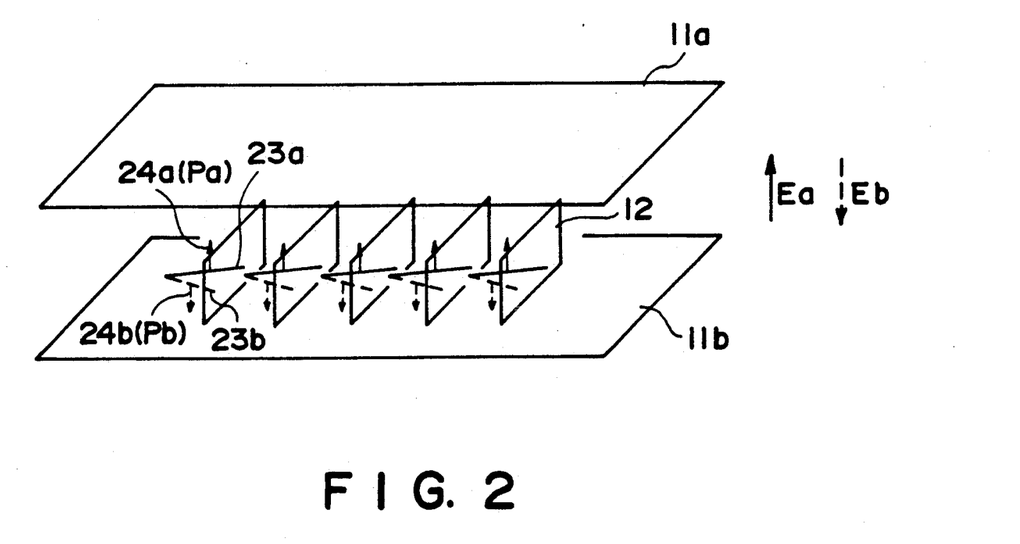
FIG. 2 is a schematic perspective view of a ferroelectric liquid crystal device of the type used in the present invention.

Referring to FIG. 1, there is schematically shown an example of a liquid crystal cell using a ferroelectric liquid crystal having a helical structure. Reference numerals 11a and 11b denote substrates (glass plates) on which a transparent electrode of, e.g., $In_2O_3$, $SnO_2$, ITO (Indium Tin Oxide), etc., is disposed, respectively. A liquid crystal of an SmC*-phase in which liquid crystal molecular layer 12 are oriented perpendicular to surfaces of the glass plates is hermetically disposed therebetween. Reference numeral 13 shows liquid crystal molecules. Each liquid crystal molecule 13 has a dipole moment (P⊥) 14 in a direction perpendicular to the axis thereof. When a voltage higher than a certain threshold level is applied between electrodes formed on the substrates 11a and 11b, a helical structure of the liquid crystal molecule 13 is unwound or released to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other are disposed on the upper and the lower surfaces of the glass plates, the liquid crystal cell thus arranged functions as a liquid crystal optical modulation device of which optical characteristics vary depending upon the polarity of an applied voltage. Further, when the thickness of the liquid crystal cell is sufficiently thin (e.g., 1 micron), the helical structure of the liquid crystal molecules is unwound without application of an electric field whereby the dipole moment assumes either of the two states, i.e., Pa in an upper direction 24a or Pb in a lower direction 24b as shown in FIG. 2. When electric field Ea or Eb higher than a certain threshold level and different from each other in polarity as shown in FIG. 2 is applied to a cell having the above-mentioned characteristics, the dipole moment is directed either in the upper direction 24a or in the lower direction 24b depending on the vector of the electric field Ea or Eb. In correspondence with this, the liquid crystal molecules are oriented in either of a first stable state 23a (bright state) and a second stable state 23b (dark state).

When the above-mentioned ferroelectric liquid crystal is used as an optical modulation element, it is possible to obtain two advantages. Firstly the response speed is quite fast. Secondly the orientation of the liquid crystal shows bistability. The second advantage will be further explained, e.g., with reference to FIG. 2. When the electric field Ea is applied to the liquid crystal molecules, they are oriented to the first stable state 23a. This state is stably retained even if the electric field is removed. On the other hand, when the electric field Eb of which the direction is opposite to that of the electric field Ea is applied thereto, the liquid crystal molecules are oriented to the second stable state 23b, whereby the directions of molecules are changed. Likewise, the latter state is stably retained even if the electric field is removed. Further, as long as the magnitude of the applied electric field Ea or Eb is not above a certain threshold value, the liquid crystal molecules are placed in the respective orientation states. In order to effectively realize high response speed and bistability, it is preferable that the thickness of the cell is as thin as possible and is generally 0.5 to 20 microns, particularly 1 to 5 microns. A liquid crystal-electrooptical device having a matrix electrode structure using a ferroelectric liquid crystal of the type as described above has been proposed, e.g., by Clark and Lagerwall in U.S. Pat. No. 4,367,924.

The ferroelectric liquid crystal used in the liquid crystal device according to the present invention may for example be p-decyloxybenzylidene-p'-amino2-methylbutylcinnamate (DOBAMBC), p-hexyloxybenzylidene-p'-amino-2-chloropropylcinnamate (HOBACPC), p-decyloxybenzylidene-p'-amino-2-methylbutyl-α-cyanocinnamate (DOBAMBCC), p-tetradecyloxybenzylidene-p'-amino-2-methylbutyl-α-cyanocinnamate (TDOBAMBCC), p-octyloxybenzylidene-p'-amino-2-methylbutyl-α-chlorocinnamate (OOBAMBCC), p-octyloxybenzylidene-p'-amino-2-methylbutyl-α-methylcinnamate, 4,4'-azoxycinnamic acid-bis(2-methylbutyl) ester, 4-O-(2-methylbutyl)-resorcylidene-4'-octylaniline, 4-(2'-methylbutyl)phenyl-4'-octyloxybiphenyl-4-carboxylate, 4-hexyloxyphenyl-4-(2''-methylbutyl)biphenyl-4'-carboxylate, 4-octyloxyphenyl-4-(2''-methylbutyl)biphenyl-4'-carboxylate, 4-heptylphenyl-4-(4''-methylhexyl)biphenyl-4'-carboxylate and 4-(2''-methylbutyl)phenyl-4-(4''-methylhexyl)biphenyl-4'-carboxylate. These compounds may be used singly or in mixtures of two or more species, or may further contain another cholesteric liquid crystal or smectic liquid crystal as long as the ferroelectricity is retained.

In the present invention, a ferroelectric liquid crystal in a chiral smectic phase may be used. More specifically, chiral smectic C phase (SmC*), H phase (SmH*), I phase (SmI*), K phase (SmK*) or G phase (SmG*) may be utilized.

Figure 3:
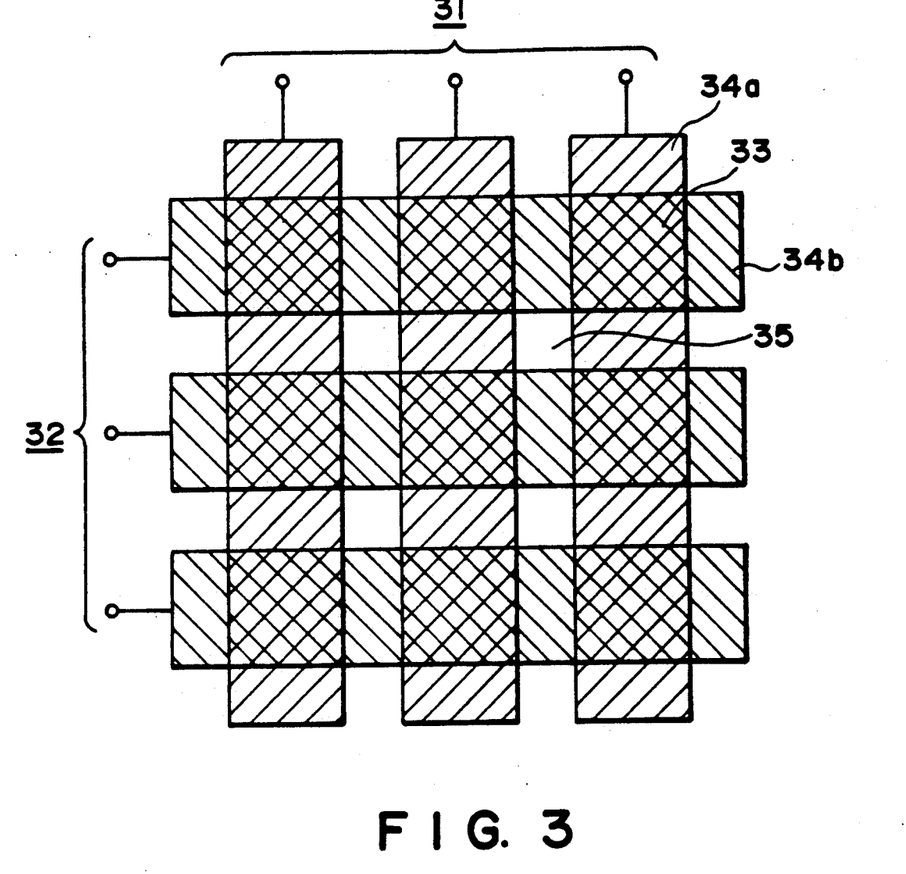
FIG. 3 is a schematic plan view of a liquid crystal device according to the present invention.

FIG. 3 is a schematic plan view showing a matrix electrode structure comprising signal electrodes 31 and scanning electrodes 32 between which a ferroelectric liquid crystal (not shown) is disposed. Pixel portions 33 are formed at portions or intersections at which the scanning electrodes and the signal electrodes face each other, while portions at which these electrodes do not face each other constitute non-pixel portions 34a, 34b and 35. The non-pixel portions 34a correspond to portions where only a signal electrode is disposed, while the non-pixel portions 34b correspond to portions where only a scanning electrode is disposed. Further, the non-pixel portions 35 correspond to portions where none of the signal electrodes and the scanning electrodes are formed.

In the matrix electrode structure shown in FIG. 3, the orientation of the ferroelectric liquid crystal at the pixel portions can be controlled electrically, whereby the molecular axes of the ferroelectric liquid crystal can be oriented to the first or second stable state depending on the direction of an electric field applied thereto. On the contrary, at the non-pixel portions 34a, 34b and 35, the average molecular axis direction of the ferroelectric liquid crystal cannot be controlled electrically, so that the orientation state obtained at the time of production is retained.

Figure 4:
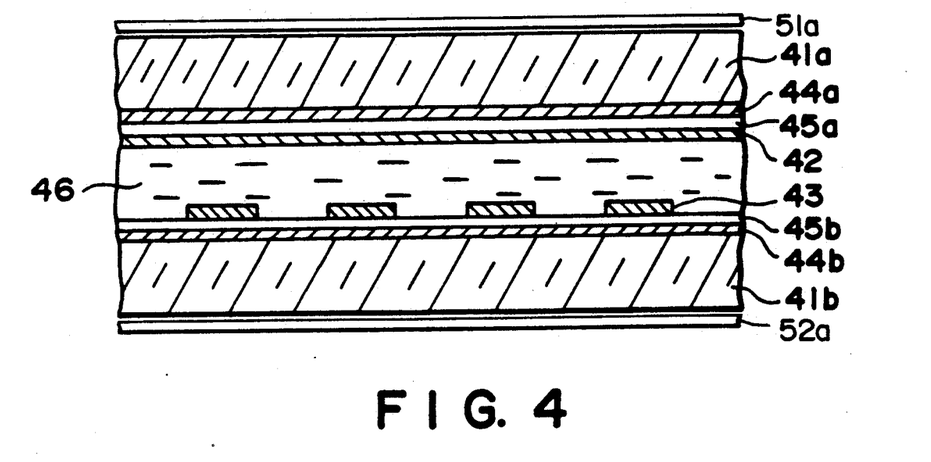
FIG. 4 is a sectional view of the liquid crystal device.

In view of the above problem, in the present invention, a whole-area electrode may be disposed as an orientation control electrode in addition to the scanning electrodes and the signal electrodes in order to control the average molecular axis direction of the ferroelectric liquid crystal at the non-pixel portions as shown in FIG. 4. In the liquid crystal device shown in FIG. 4, signal electrodes 42 and scanning electrodes 43 are used as driving electrodes to be used at the time of displaying, while a ferroelectric liquid crystal 46 at the non-pixel portions is controlled to either one orientation by a voltage (on the order of 10V) applied between whole area electrodes 44a and 44b. The whole-area electrode 44a and the signal electrodes 42 may be insulated from each other by an insulating film 45a. Similarly, the whole-area electrode 44b and the scanning electrodes 43 are insulated from each other by an insulating film 45b.

These electrodes and insulating films are supported by substrates 41a and 41b composed of glass, plastic, and the like.

Figure 5:
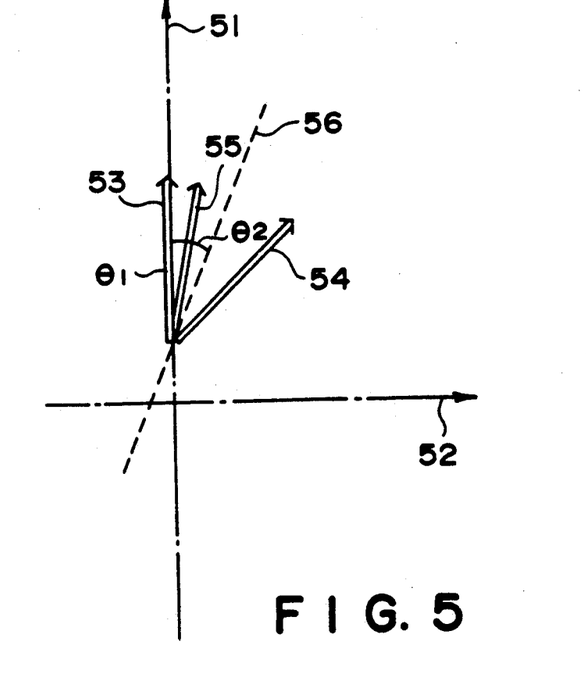
FIG. 5 is an illustrative view for schematically showing a relative arrangement of molecular axes and polarization axes according to the present invention.

FIG. 5 is a plan view schematically showing a relationship between an average molecular axis and the polarization axis of a polarizer. In FIG. 5, reference numeral 51 denotes the polarization axis of one polarizer (shown as 51a in FIG. 4), and reference numeral 52 denotes the polarization axis of the other polarizer (shown as 52a in FIG. 4). With the polarizers arranged in this manner, i.e., in a cross nicol relationship, the average molecular axis of a ferroelectric liquid crystal at pixels is oriented so as to have an average axis 53 in line with one polarization axis 51 in the dark state and oriented to have an average axis 54 between the polarization axes 51 and 52 in the bright state. The average molecular axes 53 and 54 providing the dark and bright states may be switched from one to the other and vice versa by applying voltages of mutually opposite polarities.

In the liquid crystal device according to the present invention, when the ferroelectric liquid crystal at the non-pixel portions is oriented to one stable state assuming an average molecular axis 55 by application of a voltage of one polarity (referred to hereinafter as "a positive-polarity voltage"), an angle $\theta_1$ between the average molecular axis 53 of the ferroelectric liquid crystal at the pixel portions oriented by application of a voltage of the same polarity as above (a positive-polarity voltage) and the polarization axis 51 of one polarizer is set to be smaller than an angle $\theta_2$ between the above mentioned average molecular axis 53 and the central axis (of orientation) 56 of the ferroelectric liquid crystal. Further, in view of the display quality, the angle between the average molecular axis at the non-pixel portions 55 and the polarization axis 51 may be set to 0° or an angle in the neighborhood thereof (below 10°). Further, in the present invention, it is not necessary that the average molecular axis 53 is parallel with the polarization axis 51 as shown in the figure, but the angle $\theta_1$ between the average molecular axis 53 and the polarization axis 51 may be smaller than the angle between the average molecular axis at the non-pixel areas 55 and the polarization axis 51. In the present invention, the intersection angle between the polarization axes 51 and 52 is preferably 90° but may be within the range of 90°±10°.

Incidentally, the central axis (of orientation) used herein is an axis dividing an angle between an average molecular axis of the ferroelectric liquid crystal which results under no electric field after application of a voltage of one polarity (e.g. positive polarity) exceeding the threshold and an average molecular axis which results under no electric field after application of a voltage of the other polarity (negative polarity) exceeding the threshold exactly in two halves. The resultant half angle corresponds to a so-called "tilt angle".

While FIG. 5 shows an example wherein the average molecular axis at the non-pixel portions 55 and the molecular axis 53 form a certain angle, the present invention is also effective in a case where the angle is substantially 0°.

Figure 6:
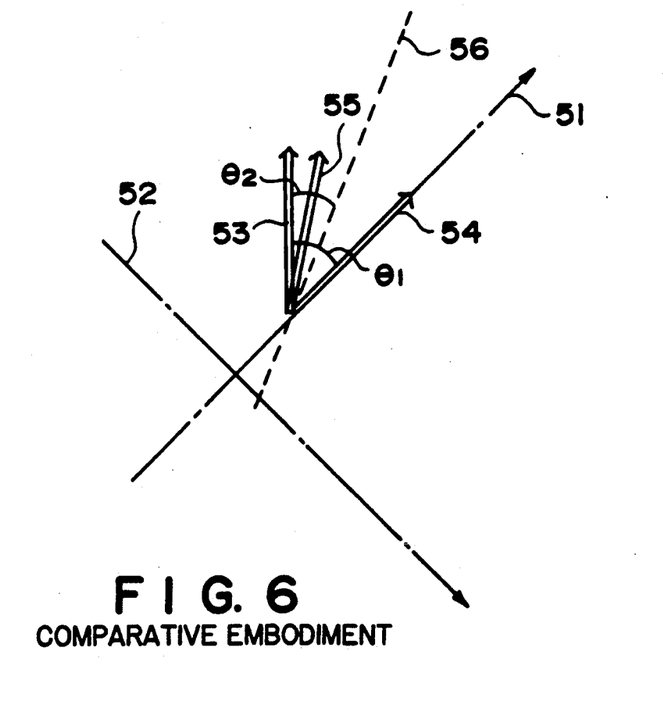
FIG. 6 is an illustrative view of a comparative-embodiment for schematically showing a relative arrangement of molecular axes and polarization other than the present invention.

FIG. 6 shows a liquid crystal device outside the present invention. More specifically, in the liquid crystal device shown in FIG. 6, the angle $\theta_1$ between the polarization axis 51 of one polarizer and the average molecular axis 53 oriented after application of a positive polarity voltage is set to be larger than the angle $\theta_2$ between the average molecular axis 53 and the central axis 56.

Figure 7:
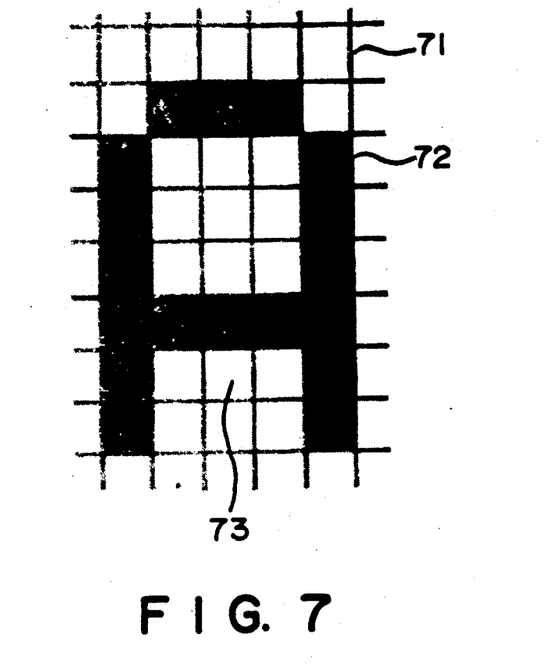
FIG. 7 is an illustration of a display state based on the present invention.
Figure 8:
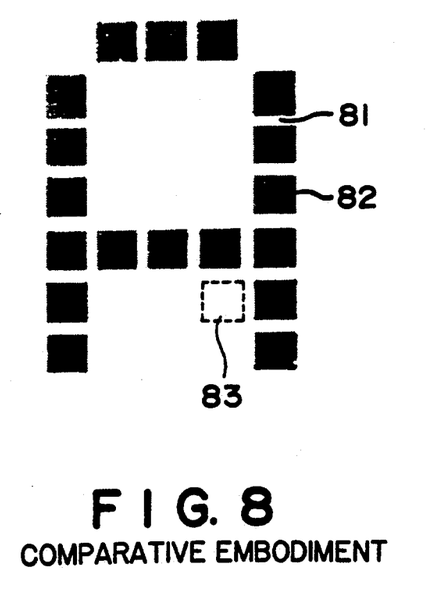
FIG. 8 is an illustration of a display state of a comparative-embodiment other than the present invention.

As a result, the liquid crystal device shown in FIG. 5 provides a display state as shown in FIG. 7, while the liquid crystal device shown in FIG. 6 provides a display state as shown in FIG. 8. More specifically, in the display example shown in FIG. 7, the non-pixel portions 71 are brought to a "black" state based on the arrangement shown in FIG. 5, while at the pixel portions, black states 72 and white states 73 are formed so as to provide a character "A" at a selected time. On the other hand, in the display example shown in FIG. 8, the non-pixel portions 81 are brought to a "white" state based on the arrangement shown in FIG. 6, while at the pixel portions, black states 82 and white states 83 are formed so as to similarly provide a character "A".

Needless to say, the quality of a dot matrix display is determined not by a contrast only at the pixel portions but by a contrast on the whole picture area including the non-pixel portions.

When FIGS. 7 and 8 are compared, they provide similar displays, but it is clear that there is a difference in brightness between a case in FIG. 8 where the non-pixel portions are brought to "white" and a case shown in FIG. 7 where the non-pixel portions are brought to "black". Now, if a transmittance at "white" portions is denoted by w, a transmittance at "black" portions is denoted by b, and the proportion of the pixel portions in the whole display area is denoted by x, the average transmittance over the whole display area including the pixel portions and the non-pixel portions is expressed as shown in the following Table 1 for respective cases:

TABLE 1

| Pixel portions | Non-pixel portions | Transmittance |
| --- | --- | --- |
| White | White | w |
| Black | White | w(1 − x) + bx |
| White | Black | wx + b(1 − x) |
| Black | Black | b |

Based on the data shown in the above Table 1, an overall contrast ratio $R_W$ when the non-pixel portions are brought to "white" and an overall contrast ratio $R_B$ when the non-pixel portions are brought to "black" are expressed by the following equations:

$$R_W = \frac{1}{1 + (b/w - 1)x}$$

-continued
$$R_B = 1 + (w/b - 1)x$$

Figure 9:
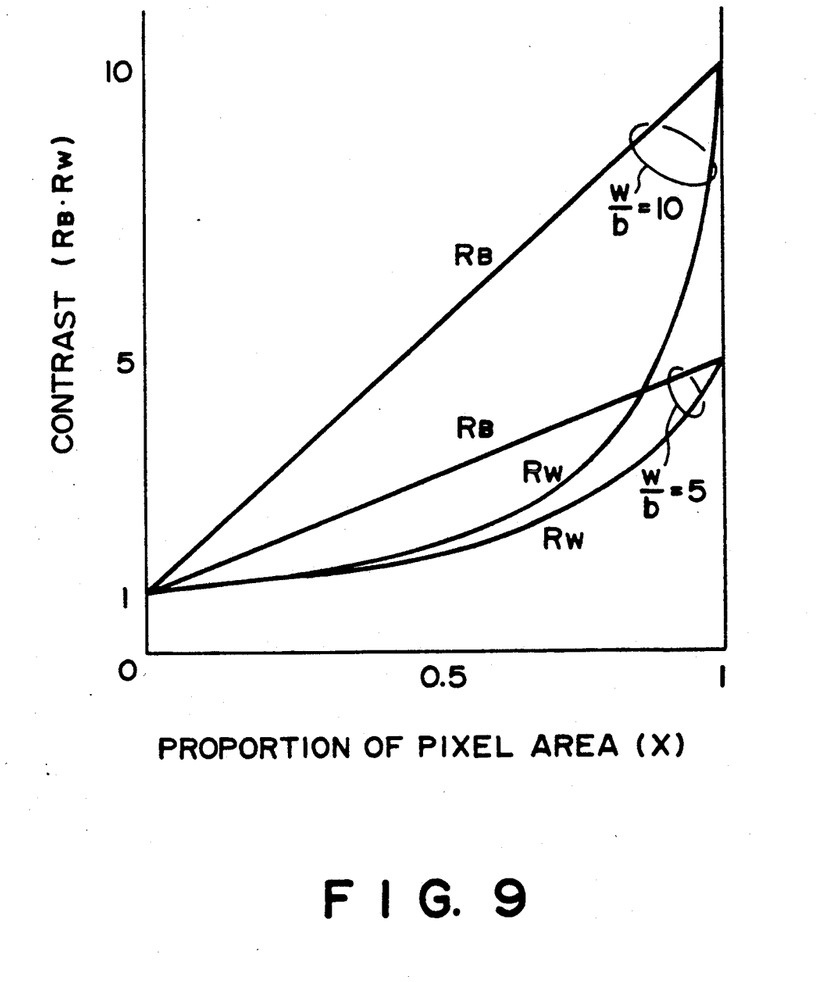
FIG. 9 is a graph explaining the relationships between contrast and proportion of pixel area.

FIG. 9 shows $R_W$ and $R_B$ as functions of x in the cases of w/b=5 and w/b=10. As will be understood from FIG. 9, $R_W$ is always smaller than $R_B$, i.e., $R_W < R_B$. Accordingly, a higher contrast ratio is obtained in a case where the non-pixel portions are made "black".

In the case of a TN-liquid crystal device, the state of non-pixel portions is determined depending on the arrangement of polarizers as far as a liquid crystal having positive dielectric anisotropy is used, i.e., "white" in case of cross nicol polarizers and "black" in case of parallel nicol polarizers. However, the parallel nicol arrangement requires a complicated treatment such as inversion of signal logic. Furthermore, the parallel nicol arrangement invites deterioration of view angle characteristics. In contrast thereto, in the case of a display using an optical modulation device having bistability as described above, the non-pixel portions can be brought to "black" (or "white") while using cross nicol polarizers, so that a good view angle characteristic and a high contrast are accomplished in combination.

Thus, according to the present invention, it is possible to increase a display contrast over the whole picture and also improve the display quality.

What is claimed is:

1. In an optical modulation device, comprising:
   (a) a cell structure including oppositely spaced electrodes forming a pixel portion where the opposite electrodes face each other and a non-pixel portion where the opposite electrodes do not face each other, and
   a chiral smectic, ferroelectric liquid crystal showing optically bistable states and disposed in a layer thin enough to release its helical structure in the absence of an electric field between the opposite electrodes over the pixel portion and the non-pixel portion; and
   (b) at least one polarizer;
   the improvement wherein the ferroelectric liquid crystal at the pixel portion is selectively oriented to assume a first average molecular axis developing a dark state in response to a voltage of one polarity exceeding the threshold or a second average molecular axis developing a bright state in response to a voltage of the other polarity exceeding the threshold;
   the ferroelectric liquid crystal at the non-pixel portion is uniformly oriented to assume a third average molecular axis developing a dark state in the absence of an electric field, said third average molecular axis is positioned between the first and second average molecular axes, the angle between the first and third average molecular axes being smaller than the angle between the second and third average molecular axes, the angle between the first or second average molecular axis and a central axis of orientation of the ferroelectric liquid crystal being larger than the angel between the third average molecular axis and the central axis; and
   the angle between the first average molecular axis and the polarization axis of the polarizer is set to be smaller than the angle between the third molecular axis and the polarization axis of the polarizer.

2. An optical modulation device according to claim 1, wherein said at least one polarizer comprises two polarizers having polarization axes crossing each other.

3. An optical modulation device according to claim 2, wherein said polarization axes cross at an angle of from 80° to 100°.

4. An optical modulation device according to claim 3, wherein said polarization axes cross at an angle of 90°.

5. An optical modulation device according to claim 1, wherein said pixel portion and non-pixel portion are respectively provided in plurality and arranged to form a matrix.

6. An optical modulation device according to claim 1, wherein said polarization axis of the polarizer is not parallel to said first average molecular axis.

7. An optical modulation device according to claim 1, wherein said popularization axis of the polarizer is parallel to said first average molecular axis.

* * * * *

UNITED STATES PATENT AND TRADEMARK OFFICE
CERTIFICATE OF CORRECTION

PATENT NO. : 5,109,291
DATED : April 28, 1992
INVENTOR(S) : YUTAKA INABA

It is certified that error appears in the above-identified patent and that said Letters Patent is hereby corrected as shown below:

COLUMN 3

Line 18, "layer 12" should read --layers 12--.

COLUMN 8

Line 17, "angel" should read --angle--.
Line 35, "plurality" should read --a plurality--.
Line 41, "popularization" should read --polarization--.

Signed and Sealed this

Fourteenth Day of September, 1993

Attest:

BRUCE LEHMAN

Attesting Officer

Commissioner of Patents and Trademarks